United States Patent
Setchell

(10) Patent No.: US 11,676,190 B2
(45) Date of Patent: *Jun. 13, 2023

(54) SELECTING ONLINE CONTENT USING OFFLINE DATA

(71) Applicant: Google LLC, Mountain View, CA (US)

(72) Inventor: William Setchell, Mendota, IL (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/369,411

(22) Filed: Jul. 7, 2021

(65) Prior Publication Data

US 2021/0334872 A1 Oct. 28, 2021

Related U.S. Application Data

(63) Continuation of application No. 15/786,583, filed on Oct. 17, 2017, now Pat. No. 11,062,368, which is a continuation of application No. 14/219,730, filed on Mar. 19, 2014, now abandoned.

(51) Int. Cl.
*G06Q 30/00* (2023.01)
*G06Q 30/0601* (2023.01)
*G06Q 30/0226* (2023.01)
*H04W 4/02* (2018.01)

(52) U.S. Cl.
CPC ..... *G06Q 30/0623* (2013.01); *G06Q 30/0226* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,055,669 B1 * | 11/2011 | Singhal | G06F 16/3322 707/765 |
| 8,412,586 B1 | 4/2013 | Foulser et al. | |
| 9,430,779 B1 | 8/2016 | Mhatre | |
| 2002/0177910 A1 * | 11/2002 | Quarterman | H04L 45/00 700/28 |

(Continued)

OTHER PUBLICATIONS

Ballard; Assembling Continuous Insight; IBM 2011; 40 pages; 2011.*

(Continued)

*Primary Examiner* — Radu Andrei
(74) *Attorney, Agent, or Firm* — Dority & Manning, P.A.

(57) ABSTRACT

Systems and methods of the disclosure relate to selecting content using beacon identifiers. An indication of a location of a user device and a beacon identifier are received. The beacon identifier can correspond to a beacon at a retail location. A data structure storing attribute data associated with the beacon identifier can be accessed. The attribute data can be associated with a signal having a unique identifier of the user device. The signal can indicate the retail location having the beacon. A request for content for display on the user device can be received. A content item can be selected for display on the user device based on the attribute data. A reward value can be determined based on receiving an indication of user interaction with the content item and the attribute data used to select the content item.

23 Claims, 4 Drawing Sheets

(56) References Cited

U.S. PATENT DOCUMENTS

| | | | | |
|---|---|---|---|---|
| 2005/0251738 | A1* | 11/2005 | Hirano | G06F 40/166 715/255 |
| 2006/0129534 | A1* | 6/2006 | Jones | G06F 16/9535 |
| 2007/0271287 | A1* | 11/2007 | Acharya | G06F 16/285 |
| 2008/0294568 | A1 | 11/2008 | Plagge | |
| 2009/0094218 | A1* | 4/2009 | Zhang | G06F 16/3341 707/999.005 |
| 2009/0224909 | A1 | 9/2009 | Derrick et al. | |
| 2009/0319372 | A1* | 12/2009 | Makeev | G06Q 40/04 705/37 |
| 2010/0225541 | A1* | 9/2010 | Hertzog | G01S 5/10 342/387 |
| 2011/0287725 | A1 | 11/2011 | Hong et al. | |
| 2012/0235812 | A1* | 9/2012 | Maia | G01S 13/08 340/539.11 |
| 2012/0309414 | A1* | 12/2012 | Rhoads | H04W 64/00 455/456.1 |
| 2013/0086509 | A1* | 4/2013 | Satyanarayana | G06F 16/3322 715/781 |
| 2013/0130781 | A1 | 5/2013 | Anderson et al. | |
| 2013/0262979 | A1* | 10/2013 | Gu | G06F 16/24578 715/234 |
| 2014/0052452 | A1* | 2/2014 | Koivuniemi | H04N 21/4821 704/E21.001 |
| 2014/0257972 | A1* | 9/2014 | Chittilappilly | G06Q 30/0246 705/14.45 |
| 2014/0365175 | A1 | 12/2014 | Packer et al. | |
| 2015/0188949 | A1* | 7/2015 | Mahaffey | H04L 63/0272 726/1 |
| 2016/0029155 | A1 | 1/2016 | Kerr et al. | |
| 2016/0285672 | A1* | 9/2016 | Huang | H04L 41/042 |
| 2017/0092278 | A1 | 3/2017 | Evermann et al. | |
| 2017/0110130 | A1 | 4/2017 | Sharifi et al. | |
| 2017/0110144 | A1 | 4/2017 | Sharifi et al. | |
| 2017/0132019 | A1 | 5/2017 | Karashchuk et al. | |
| 2017/0358301 | A1 | 12/2017 | Raitio et al. | |

OTHER PUBLICATIONS

Komninos; me-Commerce_An Infrastructure for Personal Predictive Mobile Commerce; IEEE 2006; 9 pages; 2006.*

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).

"'Dolphin' attacks fool Amazon, Google voice assistants", BBC News, Sep. 7, 2017 (8 pages).

"Google Assistant SDK", Google Developers, Google, retrieved Aug. 22, 2017 from URL: https://developers.google.com/assistant/sdk/ (4 pages).

"Products Feed Specification", Google Merchant Center Help, Google, Inc., retrieved Mar. 18, 2013 from URL: http://www.support.google.com/merchants/bin/answer.py?hl=en&answer=188494#US (6 pages).

"Supported File Formats", Google Merchant Center Help, Google, Inc., retrieved Mar. 18, 2013 from URL: http://www.support.google.com/merchants/bin/answer.py?hl=en&answer=160567 (1 page).

"Walmart and Google to offer voice-enabled shopping", BBC News, Aug. 23, 2017 (10 pages).

Aalto et al. "Bluetooth and WAP Push Based Location-Aware Mobile Advertising System", Proceedings of the 2nd International Conference on Mobile Systems, Applications, and Services, MobiSys '04, 2004, pp. 49-58 (10 pages).

Abrams, Brad, "Help users find, interact & re-engage with your app on the Google Assistant", Google Developers Blog, Nov. 15, 2017 (16 pages).

Albrecht, Chris, "Alexa, How can You be used in Restaurants?", The Spoon, Dec. 10, 2017 (6 pages).

Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).

Ballard et al., "IBM InfoSphere Streams: Assembling Continuous Insight in the Information Revolution", IBM Information Management Software, Oct. 2011 (40 pages).

Barr, Jeff, "AWS DeepLens—Get Hands-On Experience with Deep Learning With Our New Video Camera", AWS News Blog, Nov. 29, 2017 (11 pages).

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018 (6 pages).

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Coberly, Cohen, "Apple patent filing reveals potential whispering Siri functionality", Techspot, Dec. 14, 2017 (4 pages).

Collins, et al., "Can Twitter Save Itself?", CNET, Apr. 26, 2017, retrieved Aug. 22, 2017 from URL: https://www.cnet.com/news/twitter-q1-2017-earnings/ (3 pages).

Crist, Ry, "Logitech Harmony's Alexa skill just got a whole lot better", CNET, Jul. 13, 2017 (2 pages).

Estes, Adam Clark, "Amazon's Newest Gadget is a Tablet That's Also an Echo", Gizmodo, Sep. 19, 2017 (3 pages).

Final Office Action for U.S. Appl. No. 14/219,730 dated Dec. 21, 2018 (22 pages).

Final Office Action for U.S. Appl. No. 14/219,730 dated Dec. 28, 2017 (22 pages).

Final Office Action for U.S. Appl. No. 14/219,730 dated Jul. 22, 2020 (13 pages).

Final Office Action for U.S. Appl. No. 14/219,730 dated Nov. 5, 2019 (24 pages).

Final Office Action for U.S. Appl. No. 15/786,583 dated Dec. 20, 2019 (27 pages).

Final Office Action for U.S. Appl. No. 15/786,583 dated Jul. 9, 2020 (26 pages).

Forrest, Conner, "Essential Home wants to be bridge between Amazon's Alexis, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).

Gebhart, Andrew, "Google Home to the Amazon Echo: 'Anything you can do . . . '", CNET, May 18, 2017 (7 pages).

Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).

Golgowski, Nina, "This Burger King Ad is Trying to Control Your Google Home Device", HuffPost, Apr. 12, 2017 (7 pages).

Gurman, et al., "Apple is Manufacturing a Siri Speaker to Outdo Google and Amazon", Bloomberg, May 31, 2017 (5 pages).

Hardwick, Tim, "Facebook Smart Speaker Coming Next Year With 15-inch Touch Panel", MacRumors, Jul. 25, 2017 (5 pages).

Heater, Brian, "Amazon Alexa devices can finally tell voices apart", TechCrunch, Oct. 11, 2017 (6 pages).

Johnston, Lisa, "Amazon Whirlwind: New Echo, Plus, Spot, Connect, Fire TV Take the Stage", Twice, Sep. 27, 2017 (10 pages).

Kaasinen, Eija, "User needs for location-aware mobile services", Personal and Ubiquitous Computing, vol. 7, No. 1, 2003, pp. 70-79, doi:10.1007/s00779-002-0214-7 (10 pages).

Kelion, Leo, "Amazon revamps Echo smart speaker family", BBC News, Sep. 27, 2017 (11 pages).

Kelion, Leo, "Amazon's race to make Alexa smarter", BBC News, Jul. 28, 2017 (8 pages).

(56) References Cited

OTHER PUBLICATIONS

Koetsier, John, "Ads on Amazon Echo: Wendy's, ESPN, and Progressive Among Brands Testing", Forbes, May 11, 2017 (2 pages).
Komninos et al., "me-Commerce: An Infrastructure for Personal Predictive Mobile Commerce", Proceedings of the International Conference on Mobile Business (ICMB'06), IEEE, 2006 (9 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 14/219,730 dated Apr. 6, 2020 (13 pages).
Non-Final Office Action for U.S. Appl. No. 14/219,730 dated Jul. 13, 2017 (24 pages).
Non-Final Office Action for U.S. Appl. No. 14/219,730 dated Jul. 16, 2018 (28 pages).
Non-Final Office Action for U.S. Appl. No. 14/219,730 dated Jul. 18, 2019 (23 pages).
Non-Final Office Action for U.S. Appl. No. 14/219,730 dated Oct. 3, 2016 (11 pages).
Non-Final Office Action for U.S. Appl. No. 15/786,583 dated Apr. 7, 2020 (27 pages).
Non-Final Office Action for U.S. Appl. No. 15/786,583 dated Dec. 30, 2020 (21 pages).
Non-Final Office Action for U.S. Appl. No. 15/786,583 dated Sep. 10, 2019 (20 pages).
Notice of Allowance for U.S. Appl. No. 15/786,583 dated Mar. 10, 2021 (15 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges at 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
Willens, Max, "For publishers, Amazon Alexa holds promise but not much money (yet)", Digiday, Jul. 6, 2017 (6 pages).

* cited by examiner

SELECTING ONLINE CONTENT USING OFFLINE DATA

CROSS-REFERENCES TO RELATED APPLICATIONS

This application claims the benefit of priority under 35 U.S.C. § 120 as a continuation of U.S. patent application Ser. No. 15/786,583, filed Oct. 17, 2017, which claims the benefit of priority under 35 U.S.C. § 120 as a continuation of U.S. patent application Ser. No. 14/219,730, filed on Mar. 19, 2014, each of which is hereby incorporated by reference herein in its entirety.

BACKGROUND

In a networked environment such as the Internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

At least one aspect is directed to a method of selecting content via a computer network. The method can be performed by a data processing system that includes one or more processors executing on one or more servers. In one implementation, the method includes the data processing system receiving an indication of a location of a user device at a retail location. The method can include receiving a beacon identifier. The data processing system can receive the indication of the location and the beacon identifier from the user device. The beacon identifier can correspond to a beacon at a retail location. The beacon at the retail location can be configured to wirelessly provide the beacon identifier to the user device. The method can include the data processing system accessing a data structure storing, in a memory element, attribute data associated with the beacon identifier. The method can include the data processing system associating the attribute data and a signal with the unique identifier of the user device. The signal can indicate the retail location having the beacon. The method can include the data processing system receiving a request for content for display on the user device. The data processing system can receive the request via a network. The method can include the data processing system selecting a content item for display on the user device. The data processing system can select the content item responsive to the request. The data processing system can select the content item based on the attribute data associated with the unique identifier of the user device. The method can include the data processing system determining a reward value based on an interaction with the content item by the user device and the attribute data attribute data used to select the content item. The method can include the data processing system associating, in a data structure, the reward value with the retail location identified based on the signal of the attribute value. In some implementations, the method can include the data processing system transmitting an indication of interaction with the content item to the retail location.

In some implementations, the method includes the data processing system receiving the beacon identifier from the user device responsive to the user device being within a proximity of the beacon. In some implementations, the method includes the beacon transmitting the beacon identifier via Bluetooth. In some implementations, the method includes the beacon transmitting the beacon identifier using a near field communications standard.

In some implementations, the method includes the data processing system receiving a ping from the user device. The ping can include geographic location information of the user device. The method can include the data processing system determining, based on the geographic location information, the retail location. The method can include the data processing system generating the signal based on the determination of the retail location. In some implementations, the method includes the data processing system determining the retail location based on the beacon identifier. In some implementations, the method can include the data processing system receiving a plurality of pings from the user device in a batch process. The plurality of pings can include geographic location information of the user device and corresponding beacon identifiers.

In some implementations, the method includes the data processing system providing a reward to the retail location based on the user interaction with the selected content item. In some implementations, the method includes the data processing system using a machine learning model to determine a weight of the attribute data used to select the content item for display. The method can include the data processing system providing a reward to the retail location based on the weight.

In some implementations, the method includes the data processing system receiving the attribute data via the retail location. The method can include the data processing system storing, in the data structure, an association between the attribute data and the retail location.

At least one aspect is directed to a system for selecting online content via a computer network. In some implementations, the system includes a data processing system having one or more processors. In some implementations, the data processing system includes one or more of a geographic location module, a beacon identifier module, a content selector, and a performance module configured to execute on one or more processors. The geographic location module can be configured to receive, from a user device, an indication of a location of the user device at a retail location. The beacon identifier module can be configured to receive a beacon identifier corresponding to a beacon at the retail location, the beacon wirelessly providing the beacon identifier to the user device. The beacon identifier module can be further configured to access a data structure storing, in a memory element, attribute data associated with the beacon identifier. The beacon identifier module can be further configured to associate the attribute data and a signal with the unique identifier of the user device, the signal indicative of the retail location having the beacon. The content selector can be configured to receive a request for content for display on the user device. The content selector can be further configured to select a content item for display on the user device based on the attribute data associated with the unique identifier of the user device. The content selector can select the content item responsive to the request. The performance module can be configured to reward the retail location based on an interaction with the content item by the user device. The retail location can be identified based on the signal of the attribute data used to select the content item.

At least one aspect is directed to a computer-readable storage device comprising processor executable instructions to select online content via a computer network. In some implementations, the instructions include instructions to receive an indication of a location of a user device and a beacon identifier from the user device. The beacon identifier can correspond to a beacon at a retail location that wirelessly provides the beacon identifier to the user device. The instructions can include instructions to access a data structure storing, in a memory element, attribute data associated with the beacon identifier. The instructions can include instructions to associate the attribute data and a signal with the unique identifier of the user device. The signal can identify the retail location having the beacon. The instructions can include instructions to receive, via a network, a request for content for display on the user device. The instructions can include instructions to select a content item for display on the user device based on the attribute data associated with the unique identifier of the user device. The instructions can include instructions to determine a reward value based on an interaction with the content item by the user device, and associate the reward value with the retail location. The retail location can be identified based on the signal of the attribute data used to select the content item.

At least one aspect is directed to a method of selecting content via a computer network. The method can be performed by a data processing system having one or more processors. The method can include the data processing system having receiving, from a content provider via a network, content items to generate a content selection campaign. The method can include the data processing system receiving from the content provider, content selection criteria for the plurality of content items. The method can include the data processing system accessing a data structure in a memory element. The data structure can store attribute data associated with a beacon identifier of a beacon at a retail location. The attribute data is related to a product item in the retail location. The method can include the data processing system determining a match between the content selection criteria and the attribute data associated with the beacon identifier.

In some implementations, the method can include the data processing system receiving the attribute data related to the product item in the retail location. The data processing system can receive the attribute data from the retail location. The method can include the data processing system receiving an indication to associate the attribute data with the beacon identifier. The method can include the data processing system associating, in the data structure, the attribute data with the beacon identifier. The method can include the data processing system further associating, in the data structure. a signal indicative of the retail location with the attribute data.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
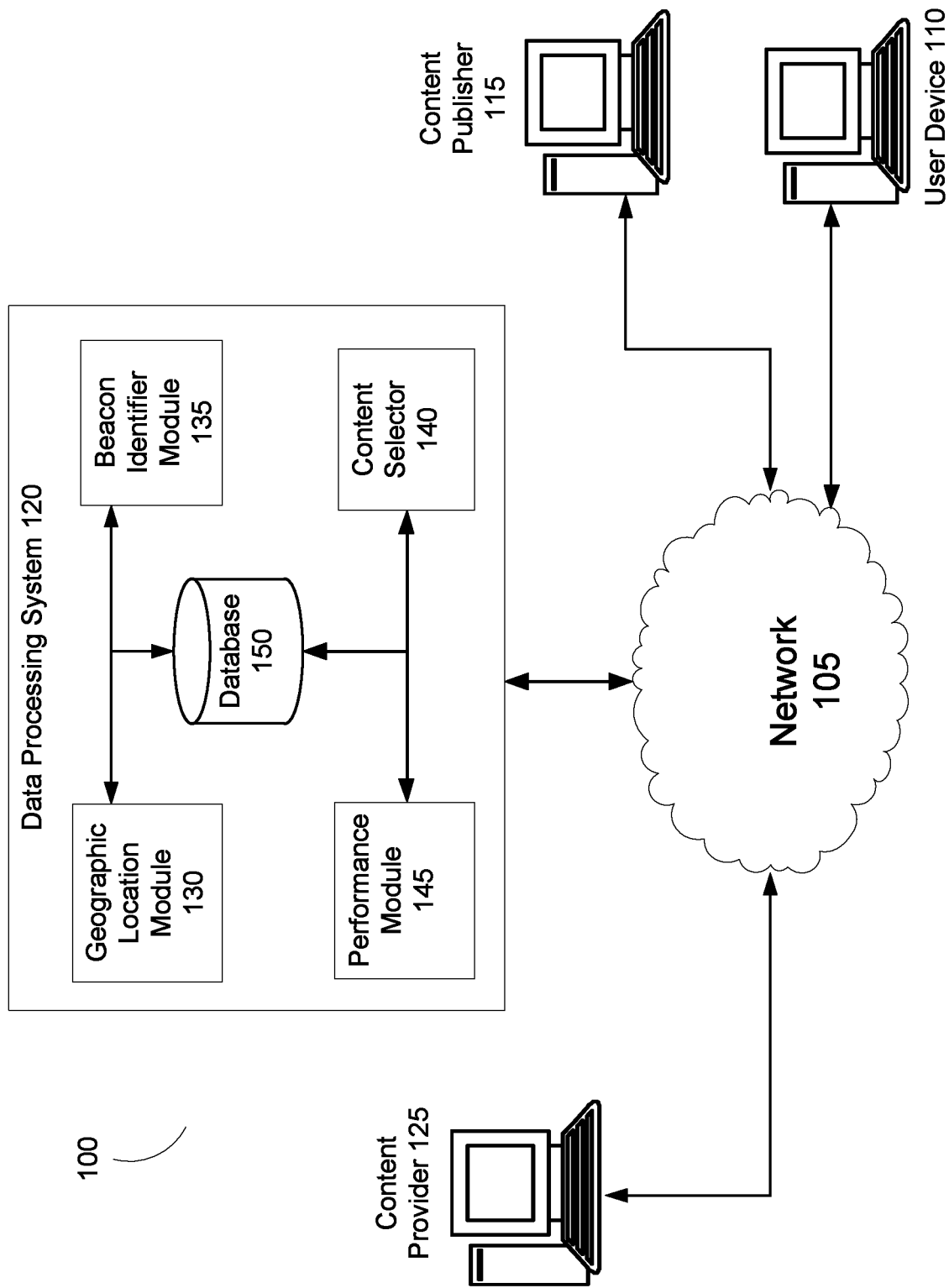
FIG. 1 is an illustration of one implementation of a system for selecting content using a beacon identifier.

Systems and methods are directed generally towards selecting content items using offline data such as attribute data associated with a unique identifier of a user device. In some implementations, the present disclosure is directed towards rewarding, compensating, incentivizing, or otherwise providing an indication of interaction to a retailer or retail location associated with a beacon that provided the beacon identifier.

In an illustrative implementation, a user device may visit or be inside a retail location such as a brick-and-mortar electronics store. In this illustration, the user device may further be proximate to a section, sub-section, location, or other area in the brick-and-mortar electronics store, such as a section that includes television on display. A beacon (e.g., a Bluetooth beacon or near field communication device) at or near this television section may transmit data such as a beacon identifier to the user device. A data processing system (e.g., a content selection server) may receive this beacon identifier from the user device via a network and determine that the user device is at or near the beacon in the electronics store corresponding to the beacon identifier.

The data processing system can identify attributes or information associated with the beacon identifier. In some implementations, the beacon identifier is associated with attribute data in a data structure. The attribute data may include information about the retail location (e.g., a name of the retail location, address, account information), information about the product (e.g., television information such as brand, price, technical specifications), or other information that may facilitate content selection. The data processing system can associate the attribute data of the beacon identifier with a unique identifier corresponding to the user device.

Thereafter, a content provider (e.g., an advertiser) can use this attribute data to facilitate content selection. In an illustrative implementation, the content provider may provide a content item (e.g., an advertisement or other online document) for a television to users that visited a television section of a brick-and-mortar retail location.

The data processing system may receive an indication of user interaction with the content item (e.g., a user of a user device may click on, select or otherwise interact with the advertisement). The data processing system, may then compensate, reward, give consideration or otherwise provide an indication to the retail location (or device of a retailer associated with the retail location) that attribute data associated with a beacon identifier of the retail location was used to select a content item and resulted in a click or conversion of a content item (or other interaction with the content item). Thus, systems and methods of the present disclosure may reward or compensate a physical retail location for providing information that was valuable or useful in selecting an online content item for display on a user device, where the selected online content may have resulted in click or conversion.

FIG. 1 illustrates one implementation of a system 100 for selecting content using beacon identifiers via a computer network such as network 105. The system 100 and its components, such as a data processing system 120, may include hardware elements, such as one or more processors, logic devices, or circuits. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, mobile computing devices, mobile telecommunication device, wearable computing device, or portable computer. In one implementation, via the network 105 a user of the user device 110 can access web pages provided by at least one content publisher 115 (e.g., a web site operator). In this implementation, a web browser of the user device 110 can access a web server of the content publisher 115 to retrieve a web page for display on a monitor of the user device 110. The content publisher 115 generally includes an entity that operates the web page. In one implementation, the content publisher 115 includes at least one web page server that communicates with the network 105 to make the web page available to the user device 110.

Although FIG. 1 shows a network 105 between the user device(s) 110, data processing system 120, content provider 125, and content publisher 115, the user device(s) 110, content publisher 115, content provider 125 and data processing system 125 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the user devices 110 and the data processing system 120, content provider 125, and content publisher 115. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 can include at least one data processing system 120. The data processing system 120 can include at least one logic device such as a computing device having a processor to communicate via the network 105 with the user device 110, the content publisher 115, and at least one content provider 125. The data processing system 120 can include at least one server. In one implementation, the data processing system 120 can include a plurality of servers located in at least one data center. In some implementations, the data processing system 120 may include multiple, logically-grouped servers and facilitate distributed computing techniques. In one of these implementations, the logical group of servers may be referred to as a server farm or a machine farm. In another of these implementations, the servers may be geographically dispersed. In other implementations, a machine farm may be administered as a single entity. In still other implementations, the machine farm includes a plurality of machine farms. The servers within each machine farm can be heterogeneous—one or more of the servers or machines can operate according to one type of operating system platform.

In one implementation, servers in the machine farm may be stored in high-density rack systems, along with associated storage systems, and located in an enterprise data center. In this implementation, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

Management of the machine farm may be de-centralized. In one implementation, one or more servers may comprise components, subsystems and circuits to support one or more management services for the machine farm. In one of these implementations, one or more servers provide functionality for management of dynamic data, including techniques for handling failover, data replication, and increasing the robustness of the machine farm. Each server may communicate with a persistent store and, in some implementations, with a dynamic store.

Server may include a file server, application server, web server, proxy server, appliance, network appliance, gateway, gateway, gateway server, virtualization server, deployment server, secure sockets layer virtual private network ("SSL VPN") server, or firewall. In one implementation, the server may be referred to as a remote machine or a node.

The data processing system 120, content provider 125, content publisher 115, and user device 110 may be deployed or executed on any type of client or server, or any type and form of computing device, such as a computer, network device or appliance capable of communicating on any type and form of network and performing the operations described herein.

In one implementation, the data processing system 120 includes a content placement system having at least one server. The data processing system 120 can also include at least one geographic location module 130, at least one beacon identifier module 135, at least one content selector 140, at least one performance module 145, and at least one database 150. In one implementation, the data processing system 120 can include a logistic regression module. The geographic location module 130, beacon identifier module 135, content selector 140, performance module 145, and logistic regression module can each include at least one processing unit or other logic device such as programmable logic array engine, or module configured to communicate with the database 150. The geographic location module 130, beacon identifier module 135, content selector 140, performance module 145, and logistic regression module can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. In one implementation, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). In one implementation, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the data processing system 120 receives content or content items from a content provider 125, such as a commercial entity, online retailer, business, advertiser, individual or any entity that wants to provide content for display on a user device 110 via the computer network 105. The content or content items may include, e.g., text, characters, symbols, images, video, audio, or multimedia content. In one implementation, a content item may include an online advertisement, article, promotion, coupon, or product description.

In one implementation, the data processing system 120 includes a geographic location module 130 designed and constructed to determine a geographic location of or associated with a user device 110. In some implementations, the geographic module 130 receives geo-location data points associated with a user device 110. The data processing system can receive the data points via a computer network 105 via a TCP/IP protocol, cell phone data network, or another communication protocol of computer network 105. The data points can include location information, or the data processing system 120 can determine the location information associated with a received data point upon receiving the data point from the user device 110. The data processing system 120 can also receive an identifier associated with the data point, such as a unique user device identifier, or a username associated with an application executing on the user device 110. In one implementation, an application executing on the user device 110 (e.g., a mobile application, a mobile operating system, a web browser, a map application, etc.) can transmit the geo-location data point that includes the location information. In one implementation, a mobile user device 110 may periodically ping the data processing system 120 or other intermediate system to provide location or time information. In one implementation, a smartphone or other cellular enabled user device 110 can ping a cell phone tower system, which may then provide location or time information to the data processing system 120.

The data processing system 120 can receive geo-location information, data points or pings responsive to a user of the user device 110 entering a search query into a search engine or other input dialogue box. In some implementations, the data processing system 120 can receive or determine geo-location information responsive to a request from a content publisher 115 or other web site operator. In some implementations, the data processing system determines the geographic location in real time, or a predetermined time interval such as a periodic basis (e.g., 10 minutes, 5 minutes, 1 minute, 30 seconds, or another period that can facilitate the systems and methods disclosed herein). In one implementation, the user device 110 pushes the data points to the data processing system 120 in real-time, periodic basis, or in a batch process. In one implementation, the user device 110 that clicked on the content item is different than the user device 110 that provides the data points (e.g., a user may use a desktop or laptop computer to click on the content item, and use a mobile device or smart phone to provide data points). In another implementation, the user device 110 used to click on the content item is the same as the user device 110 used to generate, provide or transmit the data points.

The data points may include, or the data processing system 120 may determine, geographic location information of the geo-location data point based on, e.g., GPS, Wi-Fi, IP address, Bluetooth, near field communication ("NFC"), or cell tower triangulation techniques. In some implementations, the data processing system 120 may determine a latitude and longitude coordinate and identify a larger geographic area or cell comprising the latitude and longitude coordinate. The geographic location may correspond to a latitude or longitude coordinate, or the geographic location may correspond to a larger or smaller area, in some implementations.

In some implementations, the received data points may include, or the data processing 120 may determine, geographic location information including, e.g., latitude and longitude coordinates, geographic information system ("GIS") information, country, state, city, county, town, or precinct. The data processing system 120 may receive or otherwise identify geographic location information associated with the user device 110 via an application programming interface ("API") that can provide scripted access to geographic location information associated with the user device 110. In one implementation, the geographic API specification may include a specification associated with the World Wide Web Consortium ("W3C"). In one implementation, a user of a user device 110 proactively declares a location by checking-in to a location or otherwise declaring to an application executing on the user device 110 or to the data processing system that the user is at a location.

In some implementations, the geographic location of the user device 110 can be determined via at least one of a global positioning system ("GPS"), cell tower triangulation, or Wi-Fi hotspots. In some implementation, the data processing system 120 can identify or determine the technique used to determine a geographic location in order to determine an accuracy of the determined geo-location data point (e.g., GPS-based location information may be more accurate than IP-based location information). The data processing system 120 can also determine geographic location information based on a user's interaction with an information resource. In some implementations, the user device 110 may include a global positioning system ("GPS"). In some implementations the data processing system 120 may determine a geographic location based on an internet protocol ("IP") address. In one implementation, the user device 110 may include a GPS sensor or antenna and be configured to determine a GPS location of the user device 110. The data processing system 120 can also determine the geographic location by using information obtained from one or more cell towers to triangulate the location of the user device 110. In one implementation, the geographic location determined based on one information received from one cell tower, two cell towers or three cell towers may be sufficient for content selection. In some implementations, Wi-Fi hotpots may facilitate determining a geographic location because Wi-Fi hotspots may be stationary and can be used as a landmark. In one implementation, the relation of a user device 110 with respect to a Wi-Fi hotspot can facilitate determining a geographic location of the user device 110.

In some implementations, the data processing system 120 includes a beacon identifier module 135 designed and constructed to receive, obtain or otherwise identify a beacon identifier of a beacon. The data processing system 120 may receive the beacon identifier from the user device 110 via a network. In some implementations, the data processing system 120 receives the beacon identifier along with the geographic location information. The data processing system 120 may receive the beacon identifier in real time (e.g., responsive to the user device 110 receiving the beacon identifier from a beacon or being within range of the beacon), or a predetermined time interval such as a periodic basis (e.g., 10 minutes, 5 minutes, 1 minute, 30 seconds, or another period that can facilitate the systems and methods disclosed herein). In one implementation, the user device 110 pushes one or more beacon identifier to the data processing system 120 in real-time, periodic basis, or in a batch process.

The data processing system 120 (e.g., via beacon identifier module 135) receives a beacon identifier from a user device. In some implementation, an application executing on a user device provides the beacon identifier to the data processing system 120. In some implementations, the user device generates a prompt to a user of the user device regarding whether or not to transmit the beacon identifier to the data processing system. The user device may generate the prompt in real time or in a batch process, e.g., based on a time interval or after receiving a certain number of beacon identifiers from beacon (e.g., the number of received beacon identifiers exceeds a threshold such as 10, 100, 1000). In some implementations, the user device may transmit the beacon identifiers in a batch process responsive to another event or trigger, such as upon the user device exiting a retail location.

In some implementations, the beacon identifiers may include a string, characters, symbols, numbers, alphanumeric, words, text, binary, etc. In some implementations, the beacon identifier may be predetermined by an entity that establishes, manufactures, or otherwise provides the beacon. In some implementation, a beacon identifier of a beacon can be set or programmed by a retailer or other entity that establishes the beacon. In some implementations, the beacon identifier may include a root identifier such as a name of a retail chain, followed by additional information that identifies a particular retail location or section within a retail location. In some implementations, the beacon identifier may correspond to a topology or other hierarchical data structure. In an illustrative implementation, the beacon identifier may include "/retail chain name/state/city/store number/in store section/in store subsection/". In another illustrative implementation, the beacon identifier may not include any location information. The beacon identifier may, instead, include a unique identifier for the beacon that may not by itself convey location information, such as "12345ABC".

In some implementations, the beacon may transmit the beacon identifier to a user device via a wireless transmission. The beacon may use any wireless transmission technique that facilitates that transmission of the beacon identifier. In some implementations, the wireless transmission technique may be configured to transmit the beacon identifier to a user device based on a transmission range. In an illustrative implementation, the beacon may transmit the beacon identifier to one or more user devices based on the user device being within a certain range of the beacon (e.g., one foot, 2 feet, 1 yard, 3 yards, etc.). In some implementations, the beacon may transmit the beacon identifier with a power level such that user devices within a certain range can receive and determine the beacon identifier. In some implementations, the beacon may transmit the beacon identifier to the user device responsive to determining a distance between the beacon identifier and the user device.

The beacon may include one or more hardware or software components. In some implementations, the beacon may include a Bluetooth beacon. In a non-limiting illustration, the Bluetooth beacon may employ one or more Bluetooth standards, such as Bluetooth v. 1.0, v 1.1, v 1.2, v 2.0+EDR, v 2.1+EDR, v 3.0+HS, Bluetooth smart (v 4.0 & 4.1), etc. In some implementations, the Bluetooth beacon employs Bluetooth Low Energy ("LE") which can be configured to provide reduced power consumption. The Bluetooth beacon can be configured to use any wavelength including, e.g., UHF radio waves in the ISM band from about 2.4 to about 2.5 GHz, or other frequencies that facilitate systems and methods of content selection using beacon identifiers.

In some implementations, the beacon is configured to transmit the beacon identifier using near field communication ("NFC"). NFC can refer to a set of standards used to establish radio communication between mobile devices (such as a beacon and a user device) by bringing them into close proximity or touching them together (e.g., within a few inches). In some implementations, the Beacon may be powered, while in other implementations the beacon may include an unpowered NFC chip such as a tag. NFC can be based on radio-frequency identification ("RFID"). In a non-limiting illustration, NFC can employ standards such as ISO/IEC 1443, ISO/IEC 18092, and operate using a frequency of about 13.56 MHz.

In some implementations, the beacon may employ one or both of Bluetooth and NFC technologies. In some implementations, the beacon employ a combination of wireless protocols and technologies including, e.g., Bluetooth, NFC, WiFi, WiMax, cellular, etc. In some implementations, the user device may receive the beacon identifier via one or more wireless technologies, or may be receive different components of the beacon identifier via different wireless technologies. In an illustrative implementation, the user device may receive a first identifier via a Bluetooth LE beacon that indicates a close proximity to a section in a retail store. The user device may receive a second identifier via a second wireless technology (e.g., WiFi) that may indicate that a user device is within a retail location, but without additional information about where in the retail location.

In some implementations, the products in the retail store may be configured to provide beacon identifiers. In an illustration implementations, a television, smartphone, computer, or other electronic device in a retail store may include a built-in wireless module configured to transmit a beacon identifier. In some implementations, a manufacturer of an electronic product may establish a beacon identifier and corresponding attribute data. Thus, the data processing system 120 may generate a signal indicating the retail location of the beacon by using geographic location information separate from attribute data associated with the beacon identifier.

Upon receiving a beacon identifier via a user device 110, the data processing system 120 (e.g., via beacon identifier module 130) may perform one or more process or function using the beacon identifier. In some implementations, the data processing system 120 may access a data structure storing information associated with the beacon identifier. In some implementations, the beacon identifier is associated with attribute data. The attribute data may correspond to the beacon identifier and may be provided by an entity that established the beacon associated with the beacon identifier. The attribute data may include keywords, entities, product information, technical specifications, sale items, or other information that may describe an aspect of a location of the beacon or otherwise facilitate content selection.

In an illustrative implementation, an administrator of a brick-and-mortar electronics store may establish one or more beacons in the electronics store. A first beacon may be located at or near a television section of the electronics store, and a second beacon may be located at or near computer section of the electronics store. The administrator may determine a beacon identifier of the first beacon and provide attribute data associated with the location of the first beacon identifier such as "television", <television_brand>, "3D TV", "40" TV", price range, etc.

The data structure can store beacon identifiers and attribute data using any type of data structure or format. In an illustrative implementation, the data structure can store beacon identifiers and correspond attribute data using a table with columns and rows, as illustrated in Table 1.

TABLE 1

Illustrative implementation of beacon identifiers associated with attribute data.

| Beacon Identifier | Attribute Data 1 | Attribute Data 2 | Attribute Data 3 |
|---|---|---|---|
| 123ABC | television | <Television_brand> | Price range $500 to $1000 |
| 456DEF | Notebook computers | <computer_brand> | Price range $500 to $1000 |
| 789GHI | Mobile phones | <phone_brand> | Price range $100 to $200 |

In some implementations, the data processing system 120 can associate the attribute data with a unique identifier of the user device that provided the beacon identifier to the data processing system 120. The unique identifier may correspond to a username such as a log-in identification used to log into an application executing on the mobile device, or other unique identifier of the user device.

In addition to associating the attribute data with the unique identifier of the user device, the data processing system can also associate an indication of a source of the attribute data or the beacon identifier or the entity that established the beacon identifier or attribute data. This entity may refer to a retailer, retail location administrator, or another party associated with the beacons or attribute data. In an illustrative implementation, an owner of a physical retail store may obtain one or more beacons, place the beacons at one or more locations in the retail store, and associate attribute data with a beacon identifier of each of the beacons. The owner may have an account name, or other unique identifier that identifies the owner of the physical retail store, or other entity associated with the physical retail store (such as a company hired by the owner to establish the beacons in the retail store).

In some implementations, the data processing system 120 can generate a signal indicative of the retail location. The signal may refer to a unique identifier of the retail location (e.g., a store ID, address, store number) or a username or other identifier associated with an online account associated with the retail location. The online account may be used to establish the association between the beacon identifiers and attribute data, as well as receive compensations, rewards, or other indications associated with performance of content items that were selected for display on a user device using a beacon identifier of a beacon in a retail location associated with the account.

In some implementations, the data processing system 120 can generate, determine or otherwise identify the signal via the geographic location module 130 or beacon identifier 135. In some implementations, the data processing system 120 may include or access a database storing retail location information (e.g., physical address, latitude and longitude coordinates, etc.). Upon receiving geographic location information from a user device, the data processing system may determine that the geographic location corresponds to a retail location. In some implementations, the data processing system 120 may determine the retail location based on the received beacon identifier. In some implementations, the data processing system 120 may determine the retail location based on received WiFi data (e.g., an IP address of a router in the retail location).

Upon identifying the beacon identifier, attribute data, and a signal indicative of the retail location or account associated with the beacon, the data processing system 120 can associate this information with a unique identifier of a user device. The data processing system 120 can store this association in a database to facilitate content selection. The data processing system 120 may store this information using any data structure or file format. In some implementations, the data processing system 120 stores the association using pointers to data without having to copy and paste one or more piece of data. In an illustrative implementation, the data processing system may store the information using the following illustrative table:

TABLE 2

An illustration of associating a device identifier with a signal and attribute data.

| Device ID | Signal | Attribute Data 1 | Attribute Data 2 | Attribute Data 3 |
|---|---|---|---|---|
| Device_1 | Account_1 | television | <Television_brand> | Price range $500 to $1000 |
| Device_1 | Account_2 | Notebook computers | <computer_brand> | Price range $500 to $1000 |
| Device_1 | Account_2 | cars | <car manufacturer> | Price range $15,000 to $20,000 |

As shown in the illustrative Table 2, the device identifier may correspond to a unique device identifier or username of an application executing on a user device such as a mobile phone. The signal may indicate a retail location or account associated with the beacon providing the beacon identifier corresponding to the attribute data.

In some implementations, the data processing system may associate the beacon identifier with the device identifier, and obtain or identify the attribute data and signal at a later time. In an illustrative implementation, the data processing system may obtain the attribute data when selecting a content item for display on the user device in response to a request for a content item.

In some implementations, the data processing system 120 may store or associate a time stamp corresponding to when the user device received the beacon identifier and the signal or geographic location.

TABLE 3

An illustration of associating a device ID, signal, attribute data, and a time stamp.

| Device ID | Signal | Attribute Data 1 | Attribute Data 2 | Attribute Data 3 | Time stamp |
|---|---|---|---|---|---|
| Device_1 | Account_1 | television | <Television_brand> | Price range $500 to $1000 | MM/DD/YYYY/Time |
| Device_1 | Account_2 | Notebook computers | <computer_brand> | Price range $500 to $1000 | MM/DD/YYYY/Time |
| Device_1 | Account_2 | cars | <car manufacturer> | Price range $15,000 to $20,000 | MM/DD/YYYY/Time |

In some implementations, the data processing system 120 includes a content selector 140 designed and constructed to select a content item responsive to receiving a request for a content item. In some implementations, the request for a content item may be associated with a search query, web page, online document, a unique identifier of a user device, etc. The content selector 140 can select a content item based on information associated with the request. In some implementations, the content selector 140 selects a content item based on a search query input via user device 110 or based on content of an online document such as contextual information of a web page. The data processing system 120 may parse, analyze, match, or otherwise process one or more search terms of the search query (or keywords, entities or metadata of an online document) to identify one or more candidate content items associated with the search query. In an illustrative implementations, the data processing system 120 may receive a search query comprising the keyword "television reviews". The data processing system 120 may then parse a data structure to identify content items related to television reviews, such as advertisements or coupons for televisions. These content items may be provided by one or more content providers 125. In some implementations, the data processing system 120 may select one or more content items to provide for display on the user device based on, e.g., an online auction, advertisement score, keyword score, location, or other criteria.

The data processing system 120 may provide the content item to the web page for display in response to receiving a request for content from a computing device such as, e.g., user device 110. In some implementations, the data processing system 120 receives the request via an application executing on the user device 110. In some implementations, a mobile application executing on a mobile device (e.g., smart phone or tablet) may make a request for content. In some implementations, a web page may request content from the data processing system 120 responsive to a user of a user device 110 visiting the web page. In some implementations, the data processing system 120 may receive a request for content via a search engine and responsive to a user of a user device 110 entering a search query.

In some implementations, the request for content includes information that can facilitate content selection. In some implementations, the data processing system 120 may request information from the user device 110 to facilitate identifying content or selecting content. The data processing system 120 may request or obtain information responsive to receiving a request for content from the user device 110. The information may include information about displaying the content on the user device 110 (e.g., a content slot size or position) or available resources of user device 110 to display or otherwise manipulate the content.

In some implementations, the data processing system 120 uses information associated with a unique identifier of the user device 110 to select a content item. The information may include attribute data associated with the user device 110. The attribute data may include keywords, terms, words, phrases, or other information associated with a beacon identifier of a beacon. The data processing system 120 can use the attribute data associated with the unique identifier of the user device 110 to select a content item. In an illustrative implementation, the attribute data associated with a unique identifier of a user device 110 may include "televisions ranging from $500 to $1000". The content selector 140 can identify one or more content items provided by one or more content providers that match information associated with the request for content and the attribute data associated with the user device 110. In an illustrative implementation, the content provider may identify a content item for a television that costs $700 that is eligible for display on a user device 110 associated with attribute data of "televisions ranging from $500 to $1000".

Responsive to a request for content from a web page operator 115, the data processing system 120 provides a content item for display with a web page on a user device 110. A user of the user device 110 may view the content item (e.g., an impression) or may click on or select the content item (e.g., a click). In one implementation, an indication of user interest in the content item may include a click, selection, mouse over, finger gesture, shake motion, voice command, tap, or another indication that indicates user interest in the content item. In some implementations, the indication of user interaction may include the user using the content item (e.g., a coupon) to make a purchase at a redemption location.

In some implementations, the data processing module 120 may include a performance module 145 configured to receive indications of interaction with the content item displayed on the user device 110. The indication of interaction with the content can include a click, selection, gesture, view, conversion, or another desired action with respect to the content item. In some implementations, the data processing system 120 can provide an indication of the user interaction to a device of the retail location or retailer associated with the beacon. In some implementations, the indications of user interaction do not include any identifying information associated with a user device. In some implementations, multiple indications of user interactions may be aggregated prior to providing any indication of user interaction to a retailer. In some implementations, the indication of interaction may include a performance metric such as a click through rate or conversion rate of a content item that is selected using attribute data associated with a beacon identifier of a beacon of a retailer.

In some implementations, the data processing system 120 selects a content item for display using attribute data associated with a signal indicative of a retail location. Responsive to receiving an indication of interaction with the selected and displayed content item, the data processing system associates the indication of interaction with the signal. In an illustrative implementation, the data processing system 120 may store, in a data structure, a running count of each time an anonymous user clicked on a content item that was selected using attribute data associated with a signal, where the signal identifies a unique identifier of a retailer, retail location, online account, or other identification.

In some implementations, the data processing system 120 determines a reward value based on an interaction with the content item by the user device and the attribute data used to select the content item. The reward value may be used to reward, compensate, incentivize or otherwise provides consideration to an entity (e.g., retailer, retail location, store owner, third party advertiser) that set up or maintains the beacon associated with attribute data used to select the content item that resulted in a click, conversion, or other desired user interaction. In some implementations, the reward value may include a monetary or financial amount. In some implementations, the reward value may include other benefits such as a coupon for reduced fees, a promotion, other or services that a retailer may consider to be beneficial or rewarding.

In some implementations, the reward value or compensation may be based on the number or type of interaction with the content item. The reward value may be greater if the content item resulted in a conversion as compared to a click. In some implementations, the reward value may be greater based on the number of interactions (e.g., 1000 interactions may result in a greater reward as compared to 100 interactions). In some implementations, the reward value can be based on a performance metric such as a click through rate or a conversion rate. A click through rate of 50 clicks per 1000 impressions may result in a higher reward than a click through rate of 10 clicks per 1000 impressions. An impression may refer to each time a content item is selected using attribute data associated with a beacon identifier. That is, a beacon identifier may be associated with a click through rate if content item was selected using attribute data associated with the beacon identifier, displayed on the user device associated with the attribute data, and the content item was subsequently clicked on by a user of the user device.

In some implementations, the data processing system 120 may facilitate modifying, adjusting, or selecting attribute data associated with beacons in order to improve the performance of content items selected using attribute data of a beacon. In an illustrative implementation, a beacon located in a 3D television section of a retail store may include attributes for televisions, movies, video games and shoes. The data processing system 120 may determine that when a content item is selected using the attribute data "shoes", the content item performs poorly (e.g., low click through rate). However, the data processing system 120 may further determine that when content item is selected using the "movies" and "video games" terms of the attribute data, that the content item performs well, or relatively better (e.g., a higher click through rate or a click through rate above a threshold indicative of well performing content items or attribute data). Thus, the data processing system 120 may suggest to the retailer associated with the beacon that the performance of content items selected using attribute data of the beacon can be improved by removing the term "shoes".

In some implementations, the amount of the reward or compensation may be based on how useful or important the attribute data was in selecting the content item. The amount of the reward may be proportional to the incremental knowledge provided by the attribute data. In other words, whether or not the content item would have been selected without the use of attribute data. In an illustrative implementation, a data processing system 120 may select content items using location information, browsing history data, search query data, as well as attribute data associated with a beacon. However, if the data processing system 120 would have selected the same content item without using the attribute data, then the data processing system 120 may determine that the attribute data was not important because it would not have resulted in selecting a different content item. That is, the data processing system 120 would have selected the content item regardless of whether the attribute data was present. In this situation, the data processing system 120 may determine that the attribute data was not very important.

In an illustrative implementation, a user may enter, via a user device, a search query for "television reviews". The data processing system may determine that the user device is associated with attribute data corresponding to a television section of a retail store. The data processing system may then select an advertisement for a television and provide it for display on the user device. In this case, the search query "television reviews" likely would have resulted in an advertisement for a television being selected for display, without the need for using the attribute data. However, if the attribute data was for shoes, and an advertisement for shoes was selected for display and received an indication of interaction, the data processing system may determine that the attribute data was useful in selecting the content and resulting in an interaction because an advertisement for shoes would not have otherwise been selected for display.

In some implementations, the data processing system 120 employs a machine learning model (e.g., a logistic regression technique) to determine weights that indicate the usefulness of the attribute data in selecting a content item. In an illustrative implementation, if a large percentage of user devices visit a socks section in a clothing store, then the data processing system 120 may associate this information with a low weight. In another illustration, a small percentage of user devices may visit a hybrid sport utility vehicle section of an automobile dealership. Thus, this information may be more useful.

Retailers may be rewarded in various ways. In some implementations, a retailer may be rewarded based on a percentage of revenue generated from content items selected using attribute data associated with beacons of the retailer.

In some implementations, the data processing system 120 is configured to provide a graphical user interface to facilitate establishing, setting up, maintaining, or modifying a content campaign (e.g., an advertising campaign). The data processing system 120 may receive content items and content selection criteria to be used to select the content items. The data processing system may provide an interface with one or more input text boxes or may receive a data file with content items or content selection criteria.

In some implementations, a content provider 125 can provide content selection criteria corresponding to attribute data. The content selection criteria may include criteria based on information related to product items, retail locations, duration, activity, frequency, etc. The content selection criteria may indicate to select one or more content items based on a type of product item (e.g., televisions, cars, luxury items, economy items, price range). The content selection criteria may indicate to select one or more content items based on a type of retail location (e.g., electronics, clothing, department store, boutique, chain).

The content selection criteria may indicate to select one or more content items based on a duration of time a user device is proximate to or within range of the beacon having the beacon identifier, or multiple beacons associated with the same or similar attribute data. The duration of time may include, e.g., 1 minute, 2 minute, 5 minutes, 10 minutes, 15 minutes, 30 minutes, or other duration that facilitates content selection. In some implementations, the content selection criteria can include a frequency of visits to a beacon identifier (or beacon identifiers associated with similar attribute data). The frequency of visits can be based on a time interval such as the number of visits within an hour, in a day, a week, a month, etc. In some implementations, content selection criteria can be based on a combination of frequency and duration, such as the number of visits in a first time interval with a visit duration greater than a second time interval (e.g., number of visits to a beacon in a month that lasted more than 10 minutes).

In some implementations, the data processing system can determine a duration of a visit based on pings received from the user device. As the pings may include the beacon identifier and a timestamp, the data processing system can determine a duration of a visit (e.g., how long the user device was within proximity to a beacon).

The data processing system can identify a match between the content selection criteria and attribute data associated with the beacon identifier. In some implementations, the data processing system determines matching attribute data in an offline process and stores the associations in a data structure. In some implementations, the data processing system determines a match in real-time, responsive to a request for a content item. In some implementations, a match may be fully or partially determined offline or responsive to a request for content based on the type of content selection. If the content selection criteria includes duration or frequency criteria, then the data processing system may determine a match between attribute data and some of the content selection criteria offline, and further determine a match between the duration and frequency criteria in real-time responsive to a request for content item. This may facilitate content selection in real time because the data processing system may identify candidate content items that match attribute data associated with beacon identifiers, and filter the candidate content items to identify an eligible content item based on the additional content selection criteria and information related to the request for content (e.g., duration and frequency information).

Figure 2:
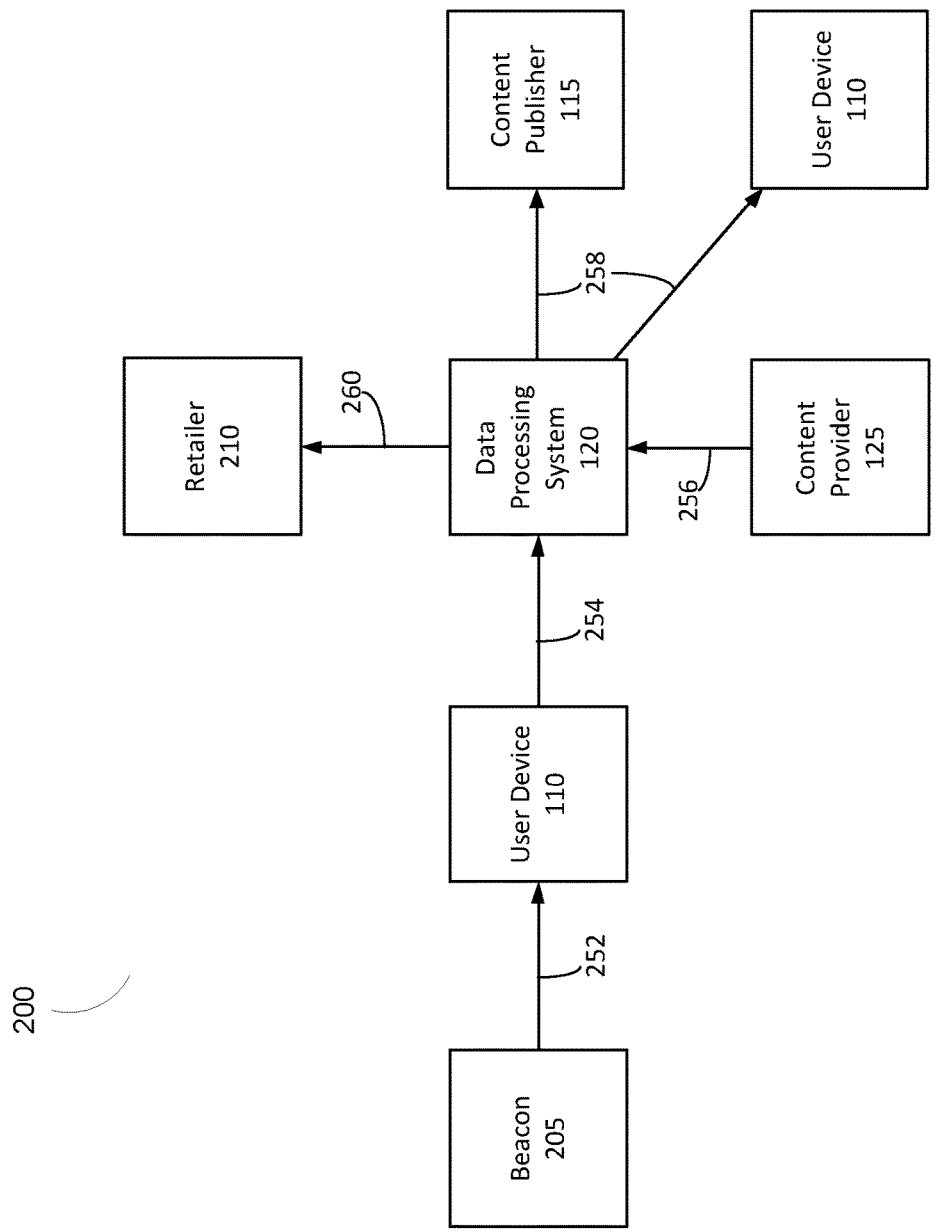
FIG. 2 is an illustration of one implementation of a flow chart for selecting content using a beacon identifier.

FIG. 2 is an illustration of one implementation of a flow chart for selecting content using a beacon identifier. In brief overview, in some implementations a beacon 205 transmits a beacon identifier to a user device 110 at step 252. At step 254, a user device 110 transmits a beacon identifier and other information (e.g., geographic location information, time stamp, or unique device identifier) to a data processing system 120. At step 256, a content provider provides content items to the data processing system 120, the content items associated with content selection criteria such as keywords. At step 258, the data processing system 120 selects and presents a content item for display on the user device via a content publisher 115 in response to a request for a content item. At step 260, and in response to an indication of interaction with the selected content item, the data processing system 120 may reward the retailer 210.

Still referring to FIG. 2, and in some implementations, a beacon 205 transmits a beacon identifier to a user device 110 at step 252. The beacon 205 may transmit the beacon identifier using one or more wireless technologies such as Bluetooth, or NFC. The beacon identifier may be transmitted to one or more user devices that are proximate to the beacon (e.g., within a range corresponding to the power of the transmission comprising the beacon identifier). In some implementations, the user device 110 and the beacon 205 perform some type of handshaking or authentication or authorization routine prior to the beacon providing the beacon identifier.

In some implementations, at step 254, a user device 110 transmits a beacon identifier and other information (e.g., geographic location information, time stamp, or unique device identifier) to a data processing system 120. The data processing system 120 may receive the beacon identifier and associated information in real time, based on a time interval, or in a batch process comprising multiple beacon identifiers and corresponding time stamps. In some implementations, the user device may store a plurality of beacon identifiers and associated time stamps or geographic locations in a memory element of the user device. The data processing system 120 may receive the beacon identifiers via a network. In some implementations, the data processing system 120 may receive the stored plurality of beacon identifiers and associated data via a network.

In some implementations, at step 256, a content provider provides content items to the data processing system 120, the content items associated with content selection criteria such as keywords. In an illustrative implementation, content selection criteria may include, represent, or refer to the following: "Display my advertisement on user devices that recently went to a retail location and visited a television section". In some implementations, the content provider 125 may request that their content item be selected for display based on timestamps associated with the beacon identifier (e.g., display content using attribute data associated with beacon identifiers that were received by a user device in the last 24 hours, 48 hours, week, month, 3 months, etc.).

In some implementations, at step 258, the data processing system 120 selects and presents a content item for display on the user device via a content publisher 115 in response to a request for a content item. The content item can be selected using attribute data as well as other information associated with the request for content, user device 110 or content publisher 115.

In some implementations, at step 260, and in response to an indication of interaction with the selected content item, the data processing system 120 may reward the retailer 210. The data processing system 120 may provide the retailer with money, a percentage of revenue generated by content items selected using attribute data of the retailer, etc.

Figure 3:
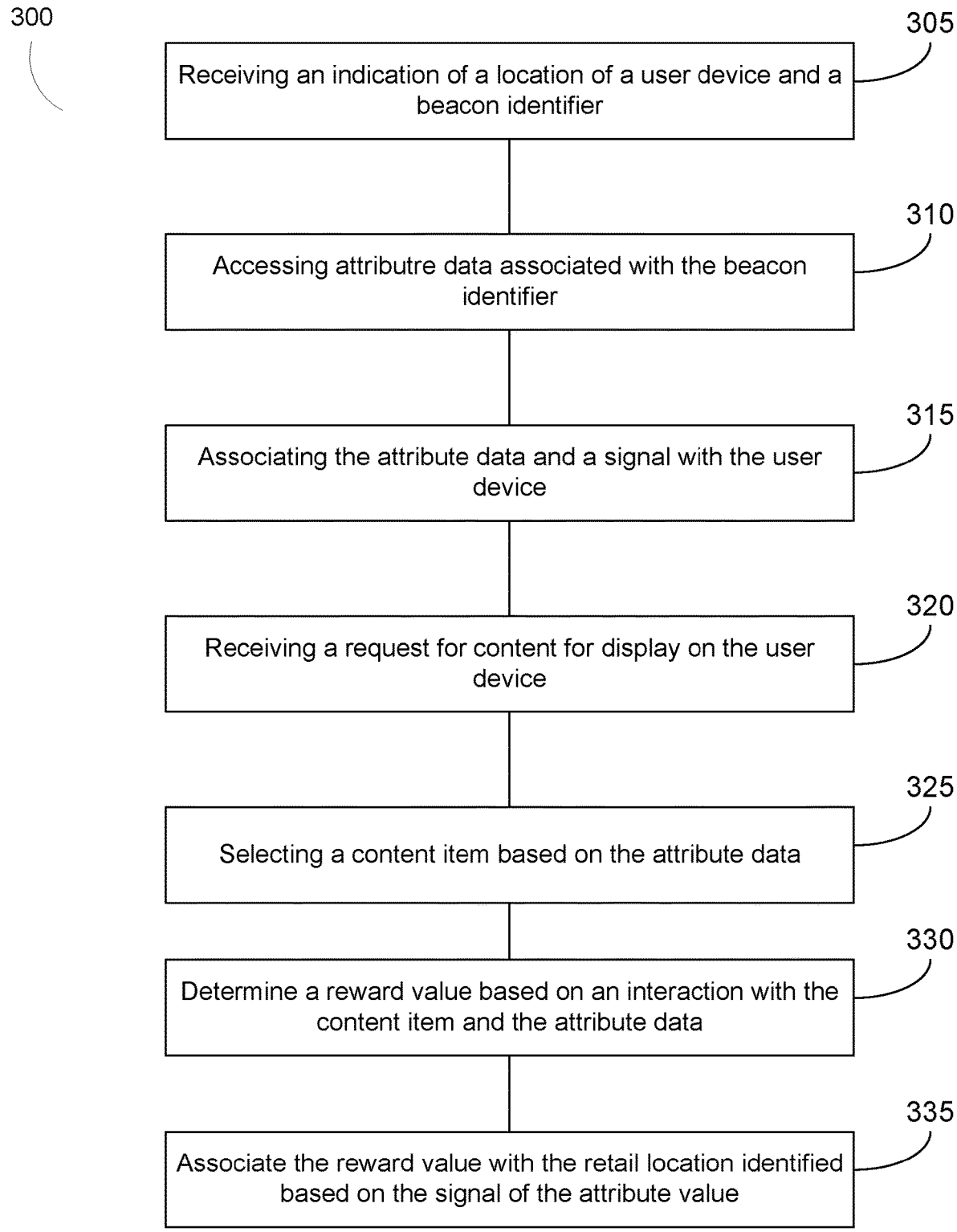
FIG. 3 is an illustration of one implementation of a method of selecting content using a beacon identifier.

FIG. 3 is an illustration of one implementation of a method of selecting content using a beacon identifier. The method can be performed by a data processing system having one or more processors. In brief overview, at step 305 the method includes the data processing receiving an indication of a location of a user device and a beacon identifier. At step 310, the method includes the data processing accessing attribute data associated with the beacon identifier. At step 315, the method includes receiving a request for content for display on the user device. At step 325, the method includes selecting a content item based on the attribute data. At step 330, the method includes the data processing system providing an indication of interaction with the content item to a retailer.

In further detail, at step 305 the method includes the data processing receiving an indication of a location of a user device and a beacon identifier. The data processing system may receive the indication of the location and the beacon identifier from the user device via a network. In some implementations, the beacon identifier may indicate the location of the user device, in which case the indication of the location and the beacon identifier may refer to the same data transmission. The beacon identifier can correspond to a beacon at a retail location that wirelessly provides the beacon identifier to the user device when the user device is proximate to or within range of the beacon (e.g., 2 meters, 1 meter, 0.5 meters, etc.). The satisfactory range can be determined by a retail location establishing the beacon or a configuration of the beacon. In an illustrative implementation, the range can be based on the wireless technology of the beacon such as a Bluetooth Low Energy beacon, an NFC beacon, or an RFID beacon. In some implementations, the beacon may utilize one or more WiFi routers or access points to determine a location of a user device within retail location, and assign an identifier corresponding to the location within the retail store.

In some implementations, the method includes the data processing system receiving a ping from the user device that includes the geographic location information of the user device. The method can include the data processing system determining, based on the geographic location information, the retail location. A data structure may store geographic coordinates for retail locations, which the data processing system may access to determine a retail location corresponding to a geographic coordinate received from the user device. The method may include generating a signal indicative of the retail location associated with the beacon identifier.

In some implementations, the method includes the user device transmitting the ping to the data processing system responsive to receiving a beacon identifier from a beacon. In some implementations, the beacon identifier can include information that causes or results in the user device transmitting the beacon identifier to the data processing system. In some implementations, the method includes an application executing on the user device that receives a beacon identifier, parses the beacon identifier to determine that the beacon identifier is to be transmitted to a data processing system, and then transmits the beacon identifier to the data processing system corresponding to a portion of the beacon identifier.

At step 310, the method includes the data processing system (e.g., via a beacon identifier module) accessing attribute data associated with the beacon identifier. The method can include accessing a data structure storing, in a memory element of the data processing system, attribute data associated with the beacon identifier. In some implementations, the method may include using a lookup module to identify the attribute data associated with the beacon identifier. In some implementations, the method may include associating one or both of the beacon identifier and attribute data with a unique identifier of the user device that received and transmitted the beacon identifier.

At step 315, the method includes receiving a request for content for display on the user device. The method may include receiving a request responsive to a user entering a search query into a search engine, or accessing an online document (e.g., a web page) of a content publisher or website publisher. The request for content may include additional information that facilitates content selection. In some implementations, the data processing system may submit a request for additional information to facilitate content selection. The information may include keywords, terms, words, associated with the search query or online document. The information may also include data associated with the user device, such as a unique identifier, location information, browsing history data, attribute data associated with a beacon, etc.

At step 325, the method includes selecting a content item based on the attribute data. The data processing system may use keywords, terms, words, phrases, technical specifications, location information, metadata, timestamps, or other information of the attribute data to select a content item. The data processing system may use content selection criteria of content items to identify a matching content item that is eligible for display on the user device. The content selection criteria may include keywords, entities, geographic regions, temporal criteria, etc.

At step 330, determining a reward value based on an interaction with the content item and the attribute data. The data processing system may determine the reward value to reward the retailer that provided the attribute information via the beacon in the retail location that was used to select a content item, which ultimately resulted in a content item impression, click, or conversion. The reward value may include a monetary reward based on the interaction. In some implementations, the reward value may be based on how valuable the attribute data is. Attribute data may be more valuable if it corresponds to relatively more unique information or resulted in a content item being selected for display that may not have otherwise been selected for display.

At step 335, the method can include the data processing system associating the reward value with the retail location. The data processing system may store the association of the reward value and the retail location in a data structure for further processing. In some implementations, the data processing system may aggregate multiple reward values to determine a sum of reward values. The method may include determining a total reward value (e.g., sum of individual reward values) over a time interval. In some implementations, the method includes the data processing system providing the reward value to the retail location. The data processing system can provide the reward value or total reward value based on the time interval (e.g., weekly, bi-weekly, monthly, quarterly, etc.).

In an illustrative implementation, the method includes the data processing system using various content selection and matching techniques to identify a content item that is eligible for display. The data processing system may score one or more content items of one or more content campaigns or content groups provided by one or more content providers. Content items can be associated with multiple content selection criteria (e.g., keywords, bids, geographic regions, audience segments, etc.). In some situations, the attribute data associated with the beacon may not make much, if any, difference with respect to what content item is selected for display, whereas in other situations the attribute data may cause a content item to be selected for display (e.g., a different content item would have been selected had it not been for the attribute data). In this situation, the data processing system may assign or apply a higher weight to the content item selected for display as a result of the attribute data, and thus provide a greater reward to the retailer that provided the attribute data should the attribute data be clicked on by a user of the user device.

In some implementations, the method includes using a machine learning model (e.g., logistic regression technique) to determine whether a beacon is important. In an illustrative implementations, a beacon may indicate that a user visited the milk section of a grocery store. The model may determine that a vast majority of user devices visit a milk section of a grocery store in a weekly basis, and thus conclude that this information is not valuable because it does not provide additional unique information for content selection. In another illustrative implementation, the beacon identifier may indicate that a user device visited a wedding dress section of a clothing store. The model may determine that this is more valuable information because it is less common.

In some implementations, the method may include rewarding the retailer based on a performance metric (e.g., click through rate or conversion rate) of content items selected using attribute data provided by one or more beacons of the retailer. The reward may be based on the performance metric exceeding a threshold or ranking high relative to other content providers (e.g., reward retail locations associated top performing beacons).

In some implementations, the revenue amount may be based on an amount of time a user device was proximate to the beacon in the retail location. The method may include determining the amount of time a user was proximate to a beacon in the retail store using the timestamps associated with each beacon identifier or ping containing a beacon identifier. The method may include the data processing system clustering the pings or timestamps to determine that a user device was proximate to a first beacon for a first duration and proximate to a second beacon for a second duration. The data processing system may compare the first duration with the second duration and determine to use the attribute data of the first beacon if the first duration exceeds the second duration. In some implementations, the method includes determining that a user device returned to the first beacon after the second beacon. The first and second beacons may be located in the same retail location or different retail locations.

Figure 4:
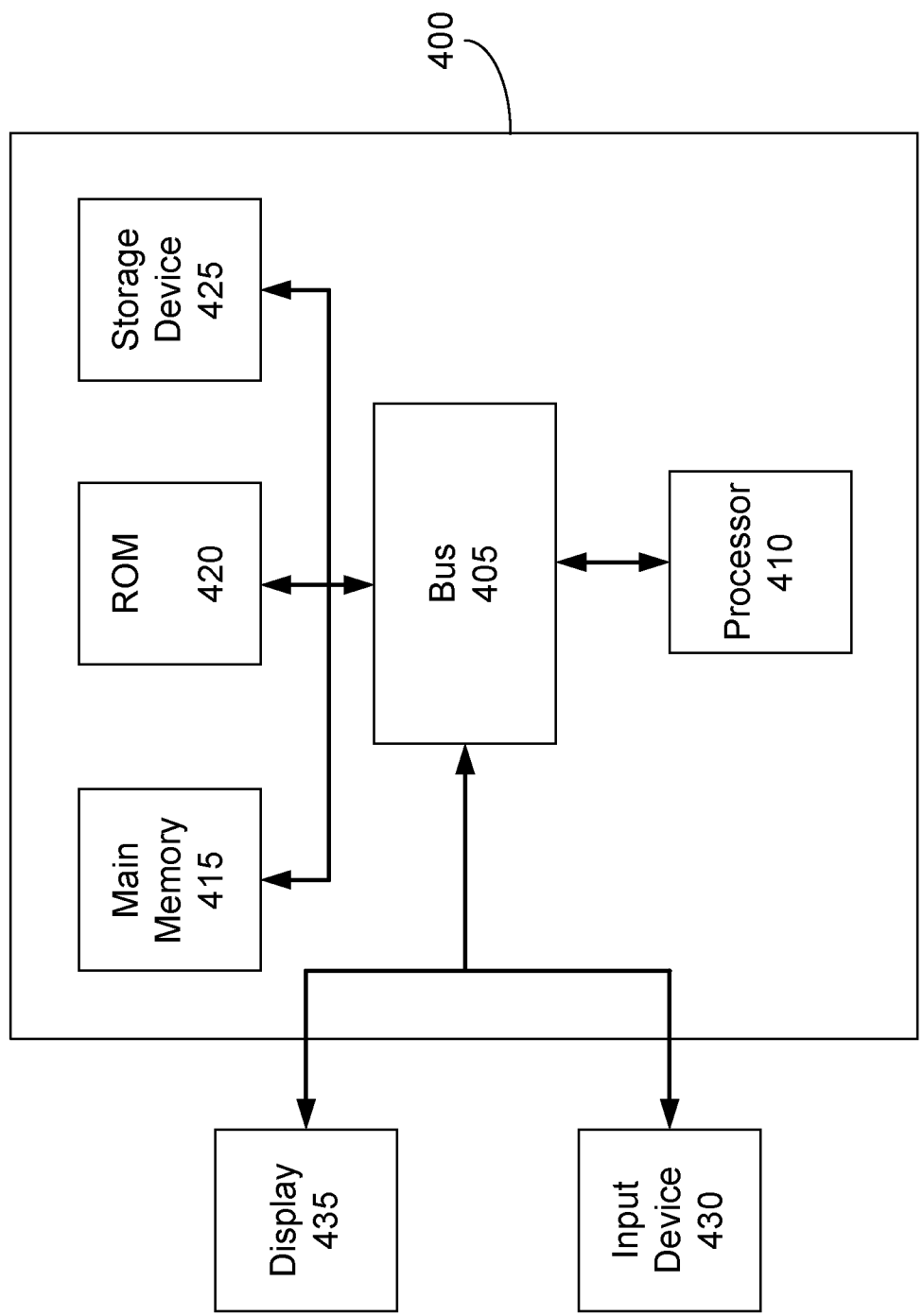
FIG. 4 is a block diagram illustrating a general architecture for a computer system that may be employed to implement various elements of the systems and methods described herein, in accordance with an implementation.

FIG. 4 is a block diagram of a computing system 400 in accordance with an illustrative implementation. The computing system or computing device 400 can be used to implement the system 100, content provider 125, user device 110, content publisher 115, data processing system 120, geographic location module 130, beacon identifier module 135, content selector 140, performance module 145, and database 150. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although a computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including without limitation a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, without limitation, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including without limitation semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Thus, in operation of some implementations, a data processing system receives a beacon identifier from a user device having a unique identifier that is or was proximate to a beacon corresponding to the beacon identifier. The beacon may be located in a retail location. The data processing system may also receive location information of the user device. The received beacon identifier and location information may be associated with one or more timestamps.

Using the beacon identifier, the data processing system identifies attribute data. This attribute data may represent information provided by an entity that established the beacon in the retail location. In an illustration, if the beacon is placed in a section of a retail store in which widgets are displayed, the attribute data may correspond to those widgets (e.g., if DVD titles are on display, the attribute data may correspond to a genre of DVDs). The data processing system can associate the identified attribute data with the unique identifier of the user device.

The data processing system may further generate a signal or other tag or identifier that indicates that this attribute data was provided by the retail location or another entity that established the beacon. The data processing can ultimately use this signal or identification information to reward the retail location that provided the attribute data in the event that a user interacts with a content item that is selected for display on the user device using this attribute data. By maintaining the information about the source of the attribute data and beacon, the data processing system compensates a retail location regardless of whether a user of a user device purchases a product at the retail location. That is, if the selected content item is provided by a third-party advertiser, and the user of the user device purchases a product or service advertised by the selected content item from this third-party rather than the retail location, the retail location may nevertheless be rewarded in the form of advertisement revenue sharing or other compensation.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for content selection via a computer network that manages power consumption, comprising:
   a data processing system comprising one or more processors and memory to:
   receive from a computing device, a plurality of pings comprising an indication of a location of the computing device at a retail location and a beacon identifier corresponding to a beacon at the retail location;
   access a data structure storing, in a memory element, attribute data associated with the beacon identifier, the attribute data comprising keywords about a product item proximate to the beacon at the retail location;
   associate the attribute data with a signal comprising a unique identifier associated with the retail location having the beacon, the signal being different than the attribute data;
   associate a unique identifier of the computing device with the attribute data and the associated signal;
   select a content item comprising audio for presentation via the computing device based on at least one term in the attribute data associated with the unique identifier of the computing device;
   transmit the content item to the computing device to cause the computing device to present the content item via an interface of the computing device;
   detect, responsive to feedback comprising a voice command detected by the computing device, an interaction with the content item comprising the audio; and
   provide an indication to remove, based on the interaction associated with an interaction rate greater than a threshold, from the attribute data, a second term different from the at least one term and not used to select the content item when the interaction rate is greater than the threshold to adjust a performance of the content selection process based on the feedback comprising the voice command.

2. The system of claim 1, comprising:
   the data processing system to receive the plurality of pings from the computing device in a batch process responsive to a trigger comprising the computing device exiting the retail location, the plurality of pings comprising geographic location information of the computing device and corresponding beacon identifiers.

3. The system of claim 1, comprising the data processing system to:
   identify a search query input via the computing device; and
   select the content item responsive to the search query.

4. The system of claim 1, comprising the data processing system to:
   identify a search query based on speech input detected by the computing device; and
   select the content item responsive to the search query.

5. The system of claim 1, comprising the data processing system to:
   receive data corresponding to speech input detected by the computing device; and
   select the content item based on the data corresponding to the speech input.

6. The system of claim 1, wherein the computing device comprises a digital assistant.

7. The system of claim 1, comprising:
   the data processing system to transmit an indication of the interaction with the content item to a device of the retail location.

8. The system of claim 1, wherein the content item is provided by a content provider device that is associated with the retail location.

9. The system of claim 1, wherein the content item is provided by a content provider device located remotely from the retail location.

10. The system of claim 1, comprising:
the data processing system to adjust a weight of the attribute data stored in the data structure based on the interaction with the content item.

11. The system of claim 1, comprising the data processing system to:
use a logistic regression technique to determine a weight of the attribute data used to select the content item for display; and
provide, based on the weight determined with the logistic regression technique, a reward to the retail location based on the weight.

12. A method for content selection via a computer network that manages power consumption, comprising:
receiving, by a data processing system comprising one or more processors and memory, from a computing device, a plurality of pings comprising an indication of a location of the computing device at a retail location and a beacon identifier corresponding to a beacon at the retail location;
accessing, by the data processing system, a data structure storing, in a memory element, attribute data associated with the beacon identifier, the attribute data comprising keywords about a product item proximate to the beacon at the retail location;
associating, by the data processing system, the attribute data with a signal comprising a unique identifier associated with the retail location having the beacon, the signal being different than the attribute data;
associating, by the data processing system, a unique identifier of the computing device with the attribute data and the associated signal;
selecting, by the data processing system, a content item comprising audio for presentation via the computing device based on at least one term in the attribute data associated with the unique identifier of the computing device;
transmitting, by the data processing system, the content item to the computing device to cause the computing device to present the content item via an interface of the computing device;
detecting, by the data processing system responsive to feedback comprising a voice command detected by the computing device, an interaction with the content item comprising the audio; and
providing, by the data processing system, an indication to remove, based on the interaction associated with an interaction rate greater than a threshold, from the attribute data, a second term different from the at least one term and not used to select the content item when the interaction rate is greater than the threshold to adjust a performance of the content selection process based on the feedback comprising the voice command.

13. The method of claim 12, comprising:
receiving, by the data processing system, the plurality of pings from the computing device in a batch process responsive to a trigger comprising the computing device exiting the retail location, the plurality of pings comprising geographic location information of the computing device and corresponding beacon identifiers.

14. The method of claim 12, comprising:
identifying, by the data processing system, a search query input via the computing device; and
selecting, by the data processing system, the content item responsive to the search query.

15. The method of claim 12, comprising:
identifying, by the data processing system, a search query based on speech input detected by the computing device; and
selecting, by the data processing system, the content item responsive to the search query.

16. The method of claim 12, comprising:
receiving, by the data processing system, data corresponding to speech input detected by the computing device; and
selecting, by the data processing system, the content item based on the data corresponding to the speech input.

17. The method of claim 12, wherein the computing device comprises a digital assistant.

18. The method of claim 12, wherein the content item is provided by a content provider device that is associated with the retail location.

19. The method of claim 12, wherein the content item is provided by a content provider device located remotely from the retail location.

20. The method of claim 12, comprising:
adjusting, by the data processing system, a weight of the attribute data stored in the data structure based on the interaction with the content item.

21. The system of claim 1, comprising the data processing system to:
use a machine learning model to determine a weight of the attribute data used to select the content item for display.

22. The method of claim 12, comprising:
using a machine learning model to determine a weight of the attribute data used to select the content item for display.

23. The method of claim 22, wherein the machine learning model is a logistic regression technique, comprising:
providing, based on the weight determined with the logistic regression technique, a reward to the retail location based on the weight.

* * * * *